United States Patent [19]

Higashimoto

[11] Patent Number: 5,307,737
[45] Date of Patent: May 3, 1994

[54] MACHINE FOR TREATING RAW MEAT
[75] Inventor: Tsuyoshi Higashimoto, Ikoma, Japan
[73] Assignee: Higashimoto Kikai Co., Ltd., Nara, Japan
[21] Appl. No.: 76,917
[22] Filed: Jun. 14, 1993
[30] Foreign Application Priority Data
Jun. 15, 1992 [JP] Japan .................. 4-181697
[51] Int. Cl.5 .......... A23C 9/00; A23C 17/00; A23L 1/31; A23L 3/34
[52] U.S. Cl. .................. 99/533; 99/487; 99/535; 366/233; 366/235
[58] Field of Search ............ 99/487, 532, 533, 535, 99/516, 472, 486, 494; 366/139, 219, 220, 225, 233, 235, 227, 228; 426/281, 58, 231, 264, 332, 652; 69/30

[56] References Cited

U.S. PATENT DOCUMENTS

| | | | |
|---|---|---|---|
| 3,880,067 | 4/1975 | Hoffmann | 99/472 |
| 4,036,122 | 7/1977 | Langen | 99/533 |
| 4,214,518 | 7/1980 | Petsche | 99/535 |
| 4,437,397 | 3/1984 | Kawai | 99/533 |
| 4,517,888 | 5/1985 | Gould | 366/233 |
| 4,520,718 | 6/1985 | Prosenbauer | 366/233 |
| 4,620,478 | 11/1986 | Corominas | 99/533 |
| 4,791,705 | 12/1988 | Corominas . | |
| 4,836,099 | 6/1989 | Thirode | 366/139 |
| 4,881,458 | 11/1989 | Higashimoto | 99/535 |
| 5,054,175 | 10/1991 | Date . | |
| 5,071,666 | 12/1991 | Handel et al. | 426/281 |
| 5,200,223 | 4/1993 | Simonsen | 99/533 |

FOREIGN PATENT DOCUMENTS

| | | |
|---|---|---|
| 0127608 | 12/1984 | European Pat. Off. . |
| 0434171 | 6/1991 | European Pat. Off. . |
| 0455611 | 11/1991 | European Pat. Off. . |
| 2460113 | 2/1981 | France ............ 99/535 |
| 1232905 | 5/1971 | United Kingdom . |
| WO8908982 | 10/1989 | World Int. Prop. O. . |

*Primary Examiner*—Timothy F. Simone
*Attorney, Agent, or Firm*—Kirschstein, Ottinger, Israel & Schiffmiller

[57] ABSTRACT

According to the invention, there is provided a machine for treating raw meat, which comprises an injecting apparatus and a plurality of massaging apparatuses. The injecting apparatus includes injecting needle means adapted to be thrust into raw meat for injecting a pickle solution, and an outlet end from which the raw meat is discharged after injecting the pickle solution thereinto. The massaging apparatuses each includes a container adapted to be charged with the raw meat having the pickle solution injected thereinto for massaging, mixing and salting the same, and an inlet end adapted to receive the raw meat and direct the same into the container. The massaging apparatuses extend longitudinally of the injecting apparatus at a position downstream of the injecting apparatus, the massaging apparatuses being arranged side by side widthwise thereof. The machine further comprises guide means for supporting and guiding the injecting apparatus or the massaging apparatuses for movement in the direction in which the massaging apparatuses are arranged side by side. The machine further comprises drive means for moving the injecting apparatus or the massaging apparatuses along the guide means to thereby align the outlet end of the injecting apparatus with the inlet end of selected one of the massaging apparatuses, whereby the raw meat can be discharged from the outlet end of the injecting apparatus and delivered onto the inlet end of the selected massaging apparatus to be directed into the container thereof.

7 Claims, 3 Drawing Sheets

MACHINE FOR TREATING RAW MEAT

FIELD OF THE INVENTION

The invention relates to a machine for treating raw meat, especially to a machine for injecting a pickle solution into the raw meat and massaging, mixing and salting the raw meat after injecting.

PRIOR ART

In the manufacturing process of ham and the like, there has been generally used an injecting apparatus including injecting needle means adapted to be thrust into the raw meat for injecting a pickle solution thereinto, as disclosed in U.S. Pat. No. 4,881,485. The apparatus further includes an outlet end from which the raw meat is discharged after injecting the pickle solution. There has been also used a massaging apparatus including a container adapted to be charged with the raw meat having the pickle solution injected thereinto for massaging, mixing and salting the same, as disclosed in U.S. Pat. No. 3, 880, 067. In the apparatus disclosed in the later patent, the container has the shape of a rotary body, the container being tilted to be rested on rollers which are mounted on a frame. The container is rotated about the longitudinal axis thereof by the rollers for massaging, mixing and salting the raw meat.

In the apparatus disclosed in the later patent, the container is movable along a floor. In operation, the container is moved to the outlet end of the injecting apparatus. The raw meat is discharged from the outlet end of the injecting apparatus and put into the container so that the container is charged with the raw meat having the pickle solution injected thereinto. The container is then moved toward the frame and tilted to be rested on the rollers. However, it has a problem that labour and time is required to move the container of the messaging apparatus to and from the outlet end of the injecting apparatus. It is inefficient.

SUMMARY OF THE INVENTION

It is an object of the invention to provide a novel and improved machine for injecting a pickle solution into the raw meat and massaging, mixing and salting the raw meat after injecting, in which it is not required to move the container of the massaging apparatus to and from the outlet end of the injecting apparatus, resulting in high efficiency.

According to the invention, there is provided a machine for treating raw meat, which comprises an injecting apparatus and a plurality of massaging apparatuses. The injecting apparatus includes injecting needle means adapted to be thrust into raw meat for injecting a pickle solution, and an outlet end from which the raw meat is discharged after injecting the pickle solution thereinto. The massaging apparatuses each includes a container adapted to be changed with the raw meat having the pickle solution injected thereinto for massaging, mixing and salting the same, and an inlet end adapted to receive the raw meat and direct the same into the container. The massaging apparatuses extend longitudinally of the injecting apparatus at a position downstream of the injecting apparatus, the massaging apparatuses being arranged side by side widthwise thereof.

The machine further comprises guide means for supporting and guiding the injecting apparatus or the massaging apparatuses for movement in the direction in which the massaging apparatuses are arranged side by side. The machine further comprises drive means for moving the injecting apparatus or the massaging apparatuses along the guide means to thereby align the outlet end of the injecting apparatus with the inlet end of selected one of the massaging apparatuses, whereby the raw meat can be discharged from the outlet end of the injecting apparatus and delivered onto the inlet end of the selected massaging apparatus to be directed into the container thereof.

In a preferred embodiment, the guide means comprises guide rails, the injecting apparatus being supported on and guided by the guide rails for movement. The guide rails extend in the direction in which the massaging apparatuses are arranged side by side. The drive means comprises means for moving the injecting apparatus along the guide rails.

The injecting apparatus is carried on a carriage which includes wheels mounted thereon for rotation and engaged with the guide rails. The drive means comprises a motor installed on the carriage and operatively connected to the wheels for rotatingly drive the wheels.

Drive means is provided between and operatively connected to the injecting apparatus and the carriage for moving the injecting apparatus along the carriage between an advanced position in which the outlet end is inserted into the inlet end of the massaging apparatus and a retracted position in which the outlet end is withdrawn from the inlet end of the massaging apparatus.

The container has the shape of a rotary body. The massaging apparatuses each includes a frame extending longitudinally of the container, the container being supported by the frame for rotation about the longitudinal axis of the container. The frame includes container drive means for rotating the container about the longitudinal axis thereof for massaging, mixing and salting the raw meat.

The frame has the shape of hollow body including a cavity formed therein and rollers installed therein for rotation. The container is received in the cavity and rested on the rollers. The container drive means comprises a motor installed in the frame and operatively connected to the rollers for rotatingly driving the rollers so that the container is rotated about the longitudinal axis thereof by the rollers. The frame further includes the opposite opening ends in the longitudinal direction thereof, one of the opening end comprising the inlet end. The other opening end comprises and outlet end from which the raw meat is discharged after massaging, mixing and salting the raw meat. The inlet and outlet ends are closed by covers. The container also includes the opposite opening ends in the longitudinal direction which are communicated with the inlet and outlet end respectively.

In another embodiment, the rollers are installed on the frame, the container being rested on the rollers. The container drive means comprises a motor installed on the frame and operatively connected to the rollers for rotatingly driving the rollers so that the container is rotated about the axis thereof by the rollers. The container includes the opposite opening ends in the longitudinal direction thereof, one of the opening end comprising the inlet end. The other opening ends comprises an outlet end from which the raw meat is discharged after massaging, mixing and salting the raw meat. The inlet and outlet ends are closed by covers.

A machine embodying the invention is hereinafter described, by way of example, with reference to the accompanying drawings.

DETAILED DESCRIPTION OF THE PREFERRED EMBODIMENT

Figure 1:
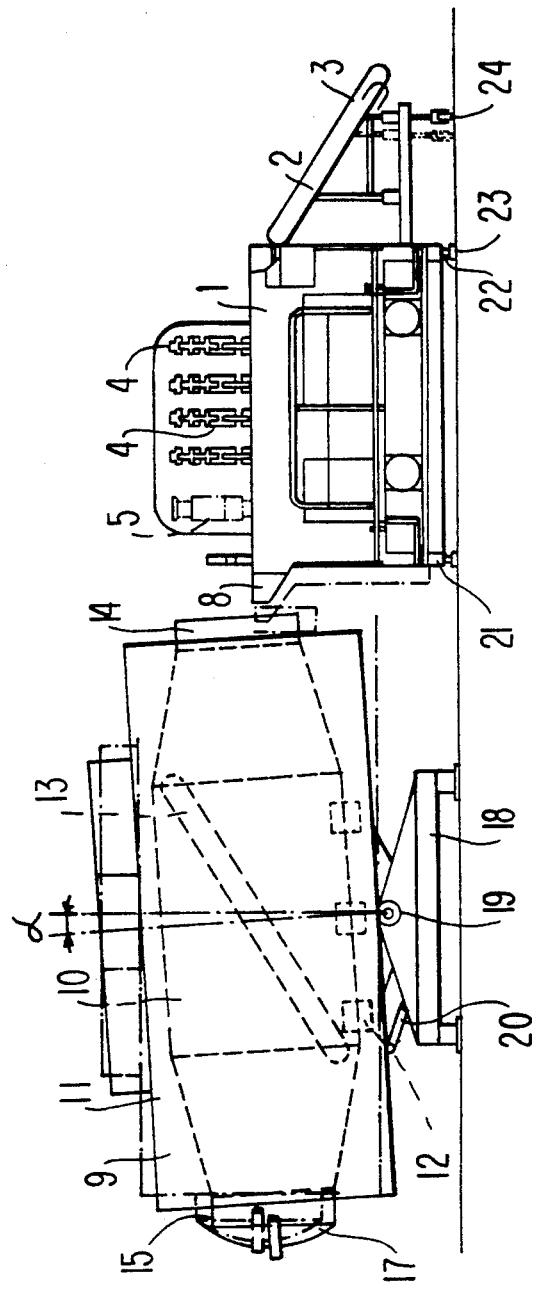
FIG. 1 is a side view of a preferred embodiment of the invention.
Figure 2:
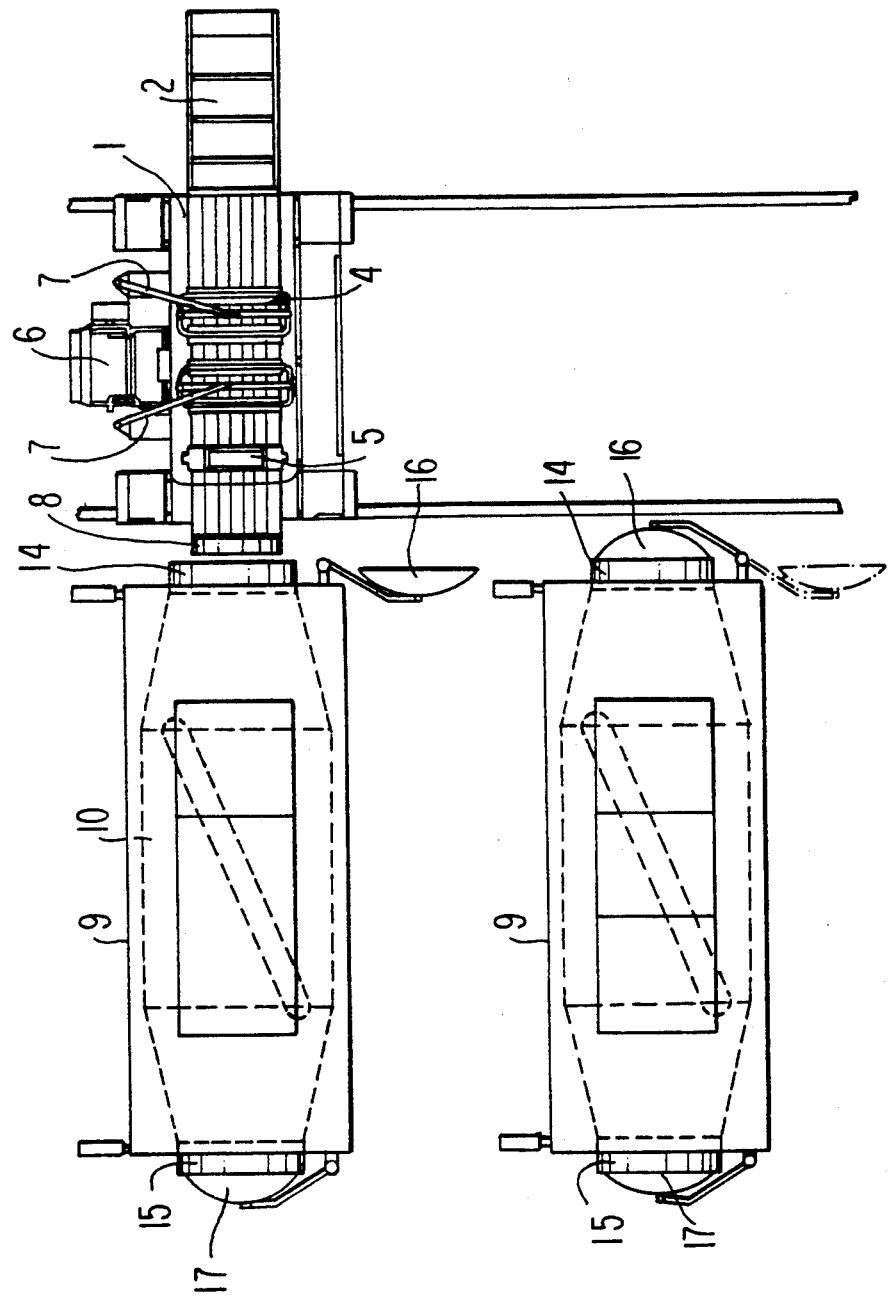
FIG. 2 is a plan view of FIG. 1 embodiment.

Referring to FIG. 1, a machine according to the invention is shown. The machine comprises an injecting apparatus 1 which includes a feed conveyor 2, raw meat being fed by the conveyor 2 from the inlet end 3 thereof into the injecting apparatus 1. The injecting apparatus 1 further includes injecting needles and cutting needles disposed therein, the injecting needles being held by holders 4, the cutting needles being held by a holder 5. A tank 6 is mounted on the side wall of the apparatus 1, as shown in FIG. 2, a pickle solution being supplied from the tank 6 to the injecting needles by means of hoses 7. The raw meat is intermittently and horizontally fed in the apparatus 1, the injecting needles being thrust into the raw meat for injecting the pickle solution thereinto, the cutting needles being also thrust into the raw meat for cutting the fibers of the raw meat, as disclosed in detail in U.S. Pat. No. 4,881,458. The apparatus 1 further includes an outlet end 8 from which the raw meat is discharged after injecting the pickle solution and cutting the fibers of the raw meat.

The machine further comprises two or more massaging apparatuses 9 which each includes a container 10 adapted to be charged with the raw meat having the pickle solution injected thereinto for massaging, mixing and salting the same. The massaging apparatuses 9 extend longitudinally of the injecting apparatus 1 at a position downstream of the injecting apparatus 1, the massaging apparatuses 9 being arranged side by side widthwise thereof.

The container 10 has the shape of a rotary body, like the container disclosed in U.S. Pat. No. 3,880,067. The apparatuses 9 each includes a frame 11 extending longitudinally of the container 10. The container 10 is supported by the frame 11 for rotation about the longitudinal axis of the container 10. In the embodiment, the container 10 has a capacity larger than the container disclosed in that Patent, the container 10 being not movable but stationary, unlike the container disclosed in the above patent. In this connection, the frame 11 has the shape of hollow body including a cavity formed therein and rollers 12 installed therein for rotation, the container 10 being received in the cavity and rested on the rollers 12. The frame 11 includes container drive means comprising a motor not shown. The motor is installed in the frame 11 and operatively connected to the rollers 12 for rotatingly driving the rollers 12 so that the container 10 is rotated about the longitudinal axis thereof by the rollers 12 for massaging, mixing and salting the raw meat. In addition, the container 10 includes a plurality of blades 13 formed on and angularly spaced along the inner surface thereof, the blades 13 extending spirally about the longitudinal axis of the container 10.

The frame 11 includes opposite opening ends 14 and 15 in the longitudinal direction thereof, one of the opening ends 14 comprising an inlet end adapted to receive the raw meat and direct the same into the container 10. The other opening end 15 comprises an outlet end from which the raw meat is discharged after massaging, mixing and salting the raw meat. The inlet and outlet ends 14 and 15 can be closed by covers 16 and 17. The container 10 also includes the opposite opening ends in the longitudinal direction which are communicated with the inlet and outlet ends 14 and 15 respectively.

The massaging apparatus 9 is the type of a seesaw in which the frame 11 is supported on the support shaft 19 of a base 18 for rockingly movement thereabout. The shaft 19 extends substantially horizontally and widthwise of the frame 11 and container 10 at a position substantially intermidiate of length of the frame 11 and the container 10. Cylinder 20 is provided between and operatively connected to the base 18 and the frame 11 to rockingly move the frame 11 about the shaft 19. Accordingly, the frame 11 and the container 10 can be inclined into an oblique position with respect to a horizontal position. The oblique position is shown in solid line, the horizontal position being shown in broken line in FIG. 1. The obliqure position has an angle α predetermined to 3° to 30° with respect to the horizontal position. The frame 11 and the container 10 can also be inclined into the reversely oblique position with respect to the horizontal position. The reversely obloque position has the same angle as the angle α with respect to the horizontal position. The frame 11 and the container 10 can also be disposed in the horizontal position. A program control apparatus not shown is connected to the cylinder 20 to control the same according to a predetermined program when massaging, mixing and salting the raw meat, as described below.

The machine further includes guide means for supporting and guiding the injecting apparatus 1 for movemnt in the direction in which the massaging apparatuses 9 are arranged side by side. The guide means comprises guide rails 23 extending in the direction in which the massaging apparatuses 9 are arranged side by side. The injecting apparatus 1 is carried on a carriage 21 which includes wheels 22 mounted thereon for rotation and engaged with the guide rails 23 so that the injecting apparatus 1 is supported on and guided by the guide rails 23 for movement. In addition, wheels 24 are mounted on the injecting apparatus 1 for rotation and engaged with a floor for supporting and guiding the conveyor 2 for movement. Drive means is provided for moving the injecting apparatus 1 along the guide rails 23 to thereby align the outlet end 8 of the injecting apparatus 1 with the inlet end 14 of selected one of the massaging apparatuses 9. The drive means comprises a motor not shown. The motor is installed on the carriage 21 and operatively connected to the wheels 22 for rotatingly drive the wheels 22. In addition, drive means such as a cylinder not shown is provided between and operatively connected to the injecting apparatus 1 and the carriage 21 to slidingly move the injecting apparatus 1 along the carriage 21 between an advanced position shown in broken line and a retracted position shown in solid line in FIG. 1.

The massaging apparatuses 9 each includes a vacuum pump and a compressor not shown, which are connected to the container 10. The vacuum pump is used to make the container 10 vacuous. The compressor is used to heighten the pressure in the container 10. The program control apparatus is connected to the vacuum pump and the compressor to control the same according to a predetermined program when massaging, mixing and salting the raw meat, as described below.

In operation, the cover 16 is opened manually or automatically at the inlet end 14 of selected one of the massaging apparatuses 9. The injecting apparatus 1 and the carriage 21 are then moved along the guide rails 23 by the motor and the wheels 22 to thereby align the outlet end 8 of the injecting apparatus 1 with the opened inlet end 14 of the selected massaging apparatus 9. The injecting apparatus 1 is then slidingly moved along the carriage 21 by the cylinder to the advanced position shown in broken line FIG. 1 so that the outlet end 8 is inserted into the inlet end 14 of the massaging apparatus 9. The frame 11 and the container 10 is rockingly moved about the shaft 19 by the cylinder 20 so that the frame 11 and the container 10 are inclined into and held in the oblique position shown in solid line in FIG. 1, simultaneously with the insertion of the outlet end 8. Accordingly, the raw meat is discharged from the outlet end 8 of the injecting apparatus 1 after injecting the pickle solution, and delivered onto the inlet end 14 of the selected massaging apparatus 9 to be directed into the container 10 thereof, so that the container 10 is charged with the raw meat having the pickle solution injected thereinto. The container 10 is rotated about the longitudinal axis thereof by the rollers 12 for massaging, mixing and salting the raw meat by the container 10 and the blades 13.

After charging the container 10 with the raw meat, the injecting apparatus 1 is slidably moved along the carriage 21 by the cylinder to the retracted position shown in solid line so that the outlet end 8 is withdrawn from the inlet end 14 of the massaging apparatus 9. The cover 16 is opened at the inlet end 14 of another massaging apparatus 9. The injecting apparatus 1 and the carriage 21 are then moved along the guide rails 23 by the motor and the wheels 22 to thereby align the outlet end 8 of the injecting apparatus 1 with the opened inlet end 14 of another massaging apparatus 9. In the massaging apparatus 9 charged with the raw meat, the cover 16 is closed manually or automatically at the inlet end 14 thereof, the container 10 being kept rotating for massaging, mixing and salting the raw meat. On the other hand, in another massaging apparatus 9, the injecting apparatus 1 is slidingly moved along the carriage 21 by the cylinder to the advanced position so that the outlet end 8 is inserted into the inlet end 14 of another passaging apparatus 9, the frame 11 and the container 10 being rockingly moved about the shaft 19 and inclined into the oblique position shown in solid line in FIG. 1. Accordingly, the raw meat is discharged from the outlet end 8 of the injecting apparatus 1 and delivered onto the inlet end 14 of another massaging apparatus 9 so that the container 10 is charged with the raw meat. The container 10 is rotated about the longitudinal axis thereof by the rollers 12 for massaging, mixing and salting the raw meat by the container 10 and the blades 13.

When massaging, mixing and salting the raw meat in each massaging apparatus 9, the vacuum pump can be used to make the container 10 vacuous to effectively massage, mix and salt the raw meat. The compressor can also be used to heighten the pressure in the container 10. The vacuum pump and the compressor can be controlled according to a predetermined program by the program control apparatus to alternately make the container 10 vacuous and heighten the pressure in the container 10. In addition, the cylinder 20 can be controlled according to the predetermined program by the program control apparatus to rocking move the frame 11 and the container 10 about the shaft 19 so that the frame 11 and the container 10 is inclined into the oblique position shown in solid line in FIG. 1 and the reversely oblique position. The raw meat therefore flows longitudinally of the container 2 whenever the container 10 is inclined. There is therefore no stagnation of the raw meat in the container 10 so that all the raw meat are effectively massaged, mixed and salted. The frame 11 and the container 12 can also be disposed in the horizontal position.

After massaging, mixing and salting the raw meat in each massaging apparatus 9, the frame 11 and the container 10 is inclined into and held in the oblique position shown in solid line in FIG. 1. The cover 17 is opened mannually or automatically at the outlet end 15 of the massaging apparatus 9. The container 10 is rotated about the longitudinal axis thereof by the rollers 12 so that the raw meat is fed by the blades 13 and discharged from the outlet end 15.

Accordingly, in this machine, labour and time is not required to move the container of the massaging apparatus to and from the outlet end of the injecting apparatus, unlike the apparatus disclosed in U.S. Pat. No. 3,880,067. In addition, while the raw meat is massaged, mixed and salted in one of massaging apparatuses 9 after charging the container 10 thereof with the raw meat, the raw meat can be discharged from the outlet end 8 of the injecting apparatus 1 to charge the container 10 with the raw meat in another massaging apparatus 9. Accordingly, the injecting apparatus 1 can be operated without pause time or with very short pause time, resulting in high efficiency.

Figure 3:
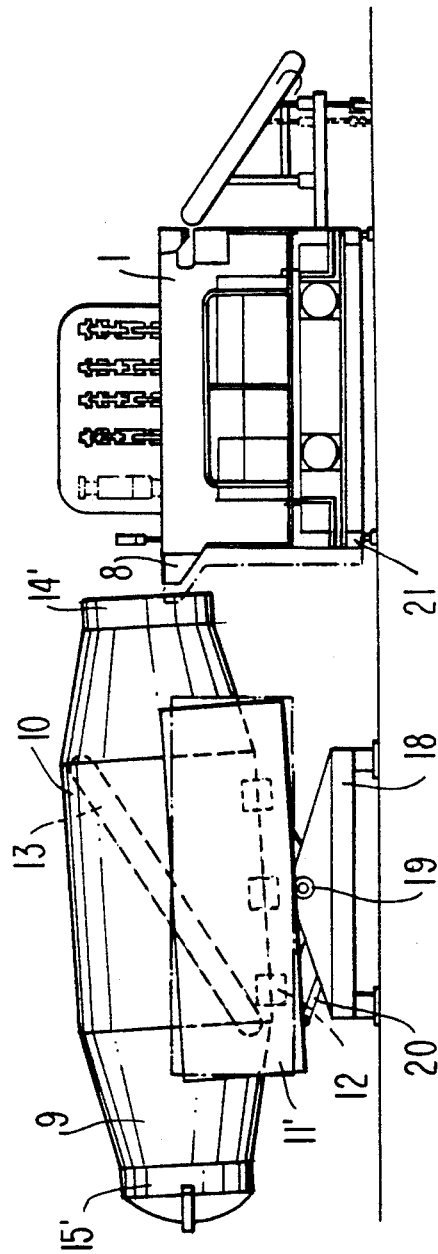
FIG. 3 is a side view of another embodiment of the invention.

Another embodiment is shown in FIG. 3, in which the rollers 12 are installed on a frame 11', the container 10 being rested on the rollers 12. The container drive means comprises a motor installed on the frame 11' and operatively connected to the rollers 12 for rotatingly driving the rollers 12 so that the container 10 is rotated by the rollers 12 about the longitudinal axis of the container 10. The container 10 includes the opposite opening ends 14' and 15' in the longitudinal direction thereof, one of the opening ends 14' comprising an inlet end adapted to receive the raw meat and direct the same into the container 10. The other opening end 15' comprises an outlet end from which the raw meat is discharged after massaging, mixing and salting the raw meat. The inlet and outlet ends 14' and 15' can be closed by covers.

It will be understood that the injecting apparatus 1 may be moved by drive means other than the motor and the wheels 22. Guide means such as guide rails may be provided for supporting and guiding not the injecting apparatus 1 but the massaging apparatuses 9 for movement in the direction in which the massaging apparatuses 9 are arranged side by side. Drive means such as motor may be provided for moving not the injecting apparatus 1 but the massaging apparatuses 9 along the guide means to thereby align the outlet end 8 of the injecting apparatus 1 with the inlet end 14 or 14' of selected one of the massaging apparatuses 9.

What is claimed is:
1. A machine for treating raw meat comprising:
an injecting apparatus including injecting needle means adapted to be thrust into the raw meat for injecting a pickle solution thereinto, and an outlet end from which the raw meat is discharged after injecting the pickle solution;

a plurality of massaging apparatuses each including a container adapted to be charged with the raw meat having the pickle solution injected thereinto for massaging, mixing and salting the same, and an inlet end adapted to receive the raw meat and direct the same into said container, said massaging apparatuses extending longitudinally of said injecting apparatus at a position downstream of said injecting apparatus, said massaging apparatuses being arranged side by side widthwise thereof;

guide means for supporting and guiding said injecting apparatus of said massaging apparatuses for movement in the direction in which said massaging apparatuses are arranged side by side; and drive means for moving said injecting apparatus or said massaging apparatuses along said guide means to thereby align said outlet end of said injecting apparatus with said inlet end of selected one of said massaging apparatuses, whereby the raw meat can be discharged from said outlet end of said injecting apparatus and delivered onto said inlet end of the selected massaging apparatus to be directed into said container thereof.

2. A machine as set forth in claim 1, wherein said guide means comprises guide rails, said injecting apparatus being supported on and guided by said guide rails for movement, said guide rails extending in the direction in which said massaging apparatuses are arranged side by side, said drive means comprising means for moving said injecting apparatus along said guide rails.

3. A machine as set forth in claim 2, wherein said injecting apparatus is carried on a carriage which includes wheels mounted thereon for rotation and engaged with said guide rails, said drive means comprising a motor installed on said carriage and operatively connected to said wheels for rotatingly drive said wheels.

4. A machine as set forth in claim 3, further comprising drive means provided between and operatively connected to said injecting apparatus and said carriage for moving said injecting apparatus along said carriage between an advanced position in which said outlet end is inserted into said inlet end of said massaging apparatus and a retracted position in which said outlet end is withdrawn from said inlet end of said massaging apparatus.

5. A machine as set forth in claim 4, wherein said container has the shape of a rotary body, said massaging apparatuses each including a frame extending longitudinally of said container, said container being supported by said frame for rotation about the longitudinal axis of the container, said frame including container drive means for rotating said container about the longitudinal axis thereof for massaging, mixing and salting the raw meat.

6. A machine as set forth in claim 5, wherein said frame has the shape of hollow body including a cavity formed therein and rollers installed therein for rotation, said container being received in said cavity and rested on said rollers, said container drive means comprising a motor installed in said frame and operatively connected to said rollers for rotatingly driving said rollers so that the container is rotated about the longitudinal axis thereof by said rollers, said frame further including the opposite opening ends in the longitudinal direction thereof, one of the opening ends comprising said inlet end, the other opening end comprising an outlet end from which said raw meat is discharged after massaging, mixing and salting the raw meat, said inlet and outlet ends being closed by covers, said container also including the opposite opening ends in the longitudinal direction which are communicated with said inlet and outlet ends respectively.

7. A machine as set forth in claim 5, wherein rollers are installed on said frame, said container being rested on said rollers, said container drive means comprising a motor installed on said frame and operatively connected to said rollers for rotatingly driving said rollers so that the container is rotated about the longitudinal axis thereof by said rollers, said container including the opposite opening ends in the longitudinal direction thereof, one of the opening ends comprising said inlet end, the other opening ends comprising an outlet end from which said raw meat is discharged after massaging, mixing and salting the raw meat, said inlet and outlet ends being closed by covers,

* * * * *